(12) United States Patent
Chargois

(10) Patent No.: US 6,591,540 B1
(45) Date of Patent: Jul. 15, 2003

(54) SUPPORT HARNESS ADAPTOR FOR FISHING REEL AND ROD

(76) Inventor: Tony Chargois, 228 Avalon Cir., Pittsburg, CA (US) 94565

( * ) Notice: Subject to any disclaimer, the term of this patent is extended or adjusted under 35 U.S.C. 154(b) by 0 days.

(21) Appl. No.: 09/829,497

(22) Filed: Apr. 9, 2001

(51) Int. Cl.[7] ............................................... A01K 97/10
(52) U.S. Cl. ............................ 43/21.2; 43/22; 224/922
(58) Field of Search ........................... 43/21.2, 22, 25; 224/922; 248/434, 435, 229.15, 227.4, 248; 403/335, 337, 338; D3/260

(56) References Cited

U.S. PATENT DOCUMENTS

| | | | | |
|---|---|---|---|---|
| 1,198,202 A | * | 9/1916 | Drinkard | 43/21.2 |
| 1,716,220 A | * | 6/1929 | Ferguson | 224/922 |
| 1,985,985 A | * | 1/1935 | Gerline | 43/21.2 |
| 2,271,136 A | * | 1/1942 | Geiger | 224/922 |
| 2,409,940 A | * | 10/1946 | Kay | 43/22 |
| 2,499,117 A | | 2/1950 | Smith | 43/21.2 |
| 2,612,712 A | * | 10/1952 | Kruze | 43/21.2 |
| 2,670,111 A | | 2/1954 | Stahle | 224/922 |
| 3,010,242 A | * | 11/1961 | Emanuel | 43/21.2 |
| 3,443,335 A | * | 5/1969 | Guydos | 43/22 |
| 3,750,918 A | | 8/1973 | Jensen | 43/21.2 |
| 4,688,814 A | * | 8/1987 | Arenhold | 248/229.15 |
| 4,815,228 A | | 3/1989 | Abel | 43/22 |
| 4,828,152 A | * | 5/1989 | Pepping | 43/21.2 |
| 5,012,607 A | * | 5/1991 | Meschkat | 43/22 |
| 5,377,441 A | * | 1/1995 | Noda | 43/22 |
| 5,573,167 A | | 11/1996 | Bebb et al. | 43/21.2 |
| 5,662,251 A | | 9/1997 | Rossiter | 43/21.2 |
| 5,915,639 A | * | 6/1999 | Farris | 43/22 |
| 5,956,884 A | * | 9/1999 | Goodrich | 43/22 |
| 6,341,466 B1 | * | 1/2002 | Kehoe et al. | 248/227.4 |

FOREIGN PATENT DOCUMENTS

| | | | | |
|---|---|---|---|---|
| FR | 969543 B1 | * | 12/1950 | 43/22 |
| GB | 29708 B1 | * | 12/1912 | 43/22 |
| GB | 2113982 B1 | * | 8/1983 | |
| GB | 2274049 B1 | * | 7/1994 | |

* cited by examiner

*Primary Examiner*—Darren W. Ark
(74) *Attorney, Agent, or Firm*—Thomas R. Lampe

(57) ABSTRACT

An adaptor is attached to a fishing rod and fishing reel to allow the use of a fishing harness with the fishing reel. The adaptor has openings for receiving harness clips and is attached to threaded connectors extending from the reel employed to clamp the reel to the rod.

1 Claim, 2 Drawing Sheets

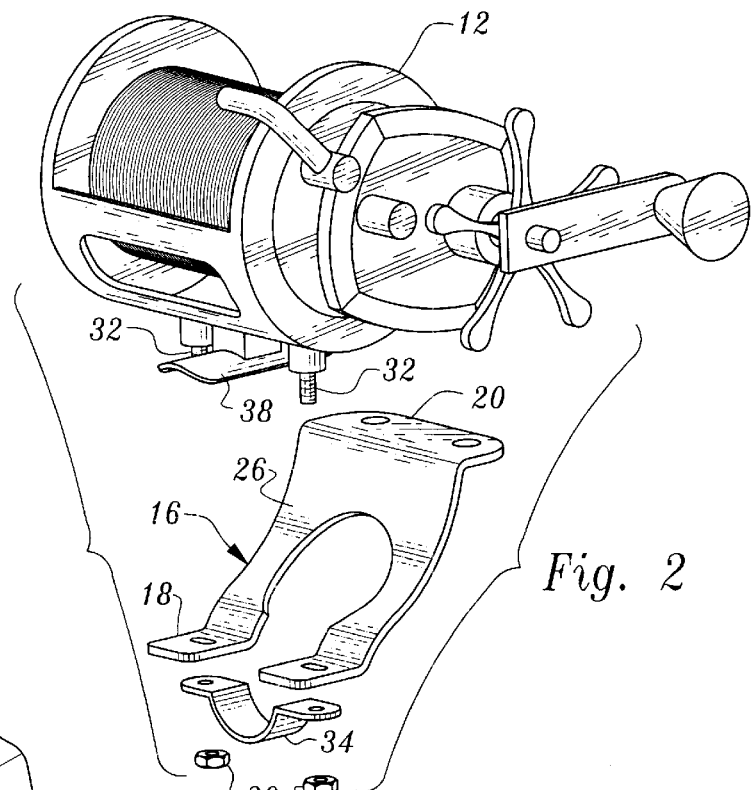
Fig. 2
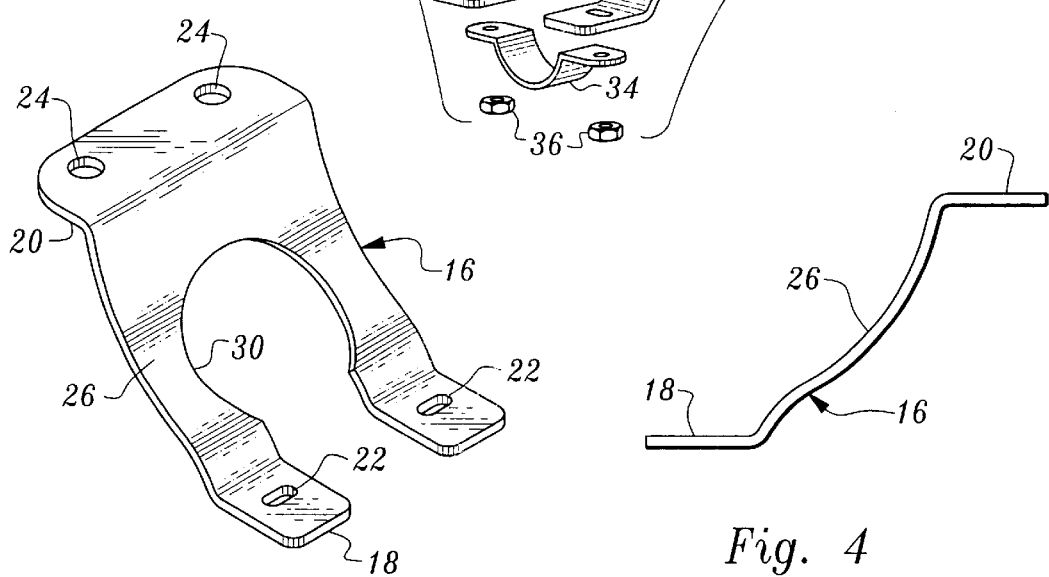
Fig. 3
Fig. 4
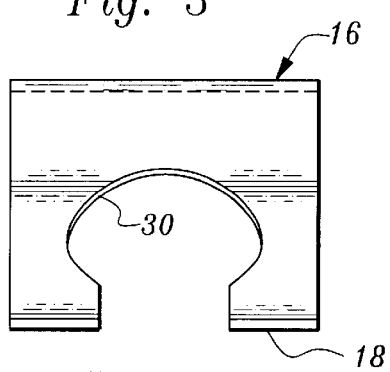
Fig. 5
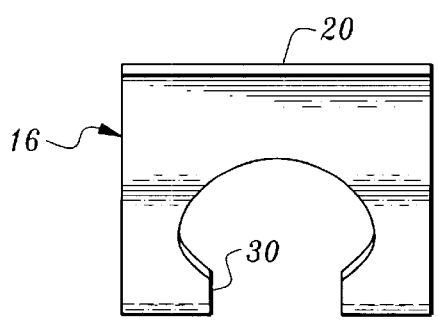
Fig. 6

SUPPORT HARNESS ADAPTOR FOR FISHING REEL AND ROD

TECHNICAL FIELD

This invention relates to fishing equipment, more particularly, to a device for adapting a fishing reel and rod for use with a support harness.

BACKGROUND OF THE INVENTION

It is well known to attach large fishing reels to a harness worn by a fisherman to relieve the fisherman from some of the work involved when fishing, particularly when fighting a fish. Typically, the handle end of the rod is positioned in a receptacle of the harness and the large reel itself has spaced openings formed in it which receive clips associated with straps of the harness. This arrangement can provide complete support for the rod and reel when the straps are tight and the fisherman is not pulling the pole toward him.

The primary reason for using a large reel equipped with clip holes is the fact that such a reel has a large fishing line capacity, in the order of hundreds of yards of line. However, fishing line has been developed relatively recently which is just as strong but has a much smaller diameter. This allows use of a smaller reel for the same length of line.

Most smaller reels do not incorporate the "clip-on" holes of larger reels. Thus, a fisherman employing a smaller reel without clip-on holes cannot readily take advantage of a support harness.

A search directed to the present invention located the following United States patents: U.S. Pat. No. 4,815,228, issued Mar. 28, 1989, U.S. Pat. No. 3,750,918, issued Aug. 7, 1973, U.S. Pat. No. 2,499,117, issued Feb. 28, 1950, U.S. Pat. No. 5,573,167, issued Nov. 12, 1996, and U.S. Pat. No. 5,662,251, issued Sep. 2, 1997.

The above-identified patents disclose various arrangements associated with fishing rods and fishing reels utilized for various purposes. However, the patents do not teach or suggest the arrangement disclosed and claimed herein nor do they address the problem solved by the present invention.

DISCLOSURE OF INVENTION

The present invention relates to an adaptor for use with a fishing rod and fishing reel to adapt the fishing rod and fishing reel for use with a support harness.

The adaptor is of rigid, unitary construction, including a first segment positionable between the fishing rod and the fishing reel and a second segment spaced from the fishing reel when the first segment is positioned between the fishing rod and the fishing reel.

The first segment defines spaced openings for receiving a pair of threaded connector elements projecting from the fishing reel to maintain the adaptor fixedly positioned relative to the fishing rod and fishing reel.

The second segment is for releasable interconnection to a support harness.

The adaptor is of simple, inexpensive construction and easy to use as well as to install. Hardware associated with the rod and reel is employed in the installation of the adaptor.

Other features, advantages and objects of the present invention will become apparent with reference to the following description and accompanying drawings.

BRIEF DESCRIPTION OF DRAWINGS

FIG. 2 is an exploded, perspective view illustrating the adaptor of the present invention being applied to a fishing reel;

FIG. 3 is a frontal, perspective view of the adaptor;

FIG. 4 is a side view of the adaptor;

FIG. 5 is a front, elevational view of the adaptor; and

FIG. 6 is a rear, elevational view of the adaptor.

BEST MODE FOR CARRYING OUT THE INVENTION

Figure 1:
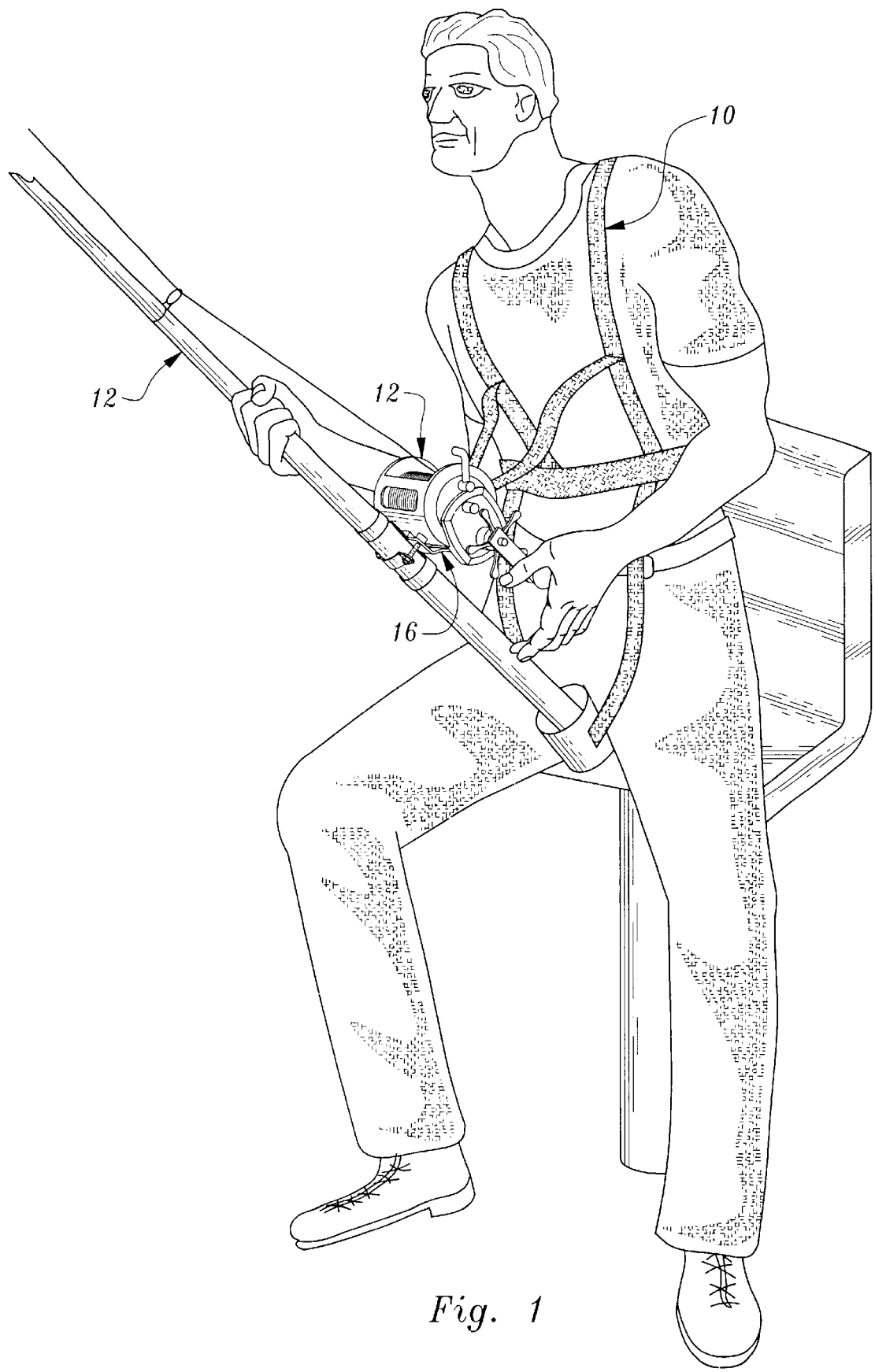
FIG. 1 is a perspective view of a fisherman utilizing the adaptor of the present invention in association with a fishing rod, fishing reel and a support harness.

Referring now to the drawings, FIG. 1 illustrates an adaptor constructed in accordance with the teachings of the present invention utilized by a fisherman to attach a support harness 10 to a fishing reel 12 and a fishing rod 14. The adaptor is designated by reference numeral 16.

The adaptor 16 is in the form of an integral plate which has been formed or shaped in some suitable manner to provide the appearance shown in the drawings. The adaptor may be formed of any suitable material such as aluminum, stainless steel or the like. The adaptor includes a first segment 18 and a second segment 20. First segment 18 is bifurcated and defines spaced openings 22. The first segment 18 is flat.

The second segment 20 of the adaptor is also flat and the second segment defines spaced apertures 24.

The first and second segments are integrally attached by a curved segment 26 of the plate. A void is defined by bifurcated first segment 18 and the curved segment or portion 26, the void being designated by reference numeral 30 in the drawings.

Extending downwardly from fishing reel 12 are two threaded connector members or stub shafts 32. When the reel is installed on the rod the threaded connector members extend alongside the fishing rod on opposite sides thereof to a clamp member 34 located under the rod. The threaded connector members pass through the clamp member and the reel is secured in place by nuts 36 attached to the threaded connector members. The reel includes a curved support 38 which bears against the top surface of the fishing rod when the reel is clamped thereto.

An important feature of the adaptor of the present invention is the fact that it can quickly and easily be installed using the same hardware employed to attach the reel to the rod. To install the adaptor the threaded connector members 32 are passed through openings 22 of the adaptor before entering the clamp member 34. Tightening of the nuts 36 will secure the adaptor against movement relative to the fishing rod and the fishing reel. The void 30 formed in the adaptor provides clearance for the curved support 38 and related structure of the reel.

When the adaptor is installed, the curved segment 26 curves around a portion of the reel. The second segment 20 projects from the reel and is spaced from the rod. To use the adaptor, the user simply attaches the clips of the harness to the adaptor at the apertures 24, as shown in FIG. 1.

The invention claimed is:

1. In combination:

a fishing rod;

a fishing reel including a curved support disposed over the fishing rod and bearing directly against an upper surface of the fishing rod;

connector means connecting said fishing reel to said fishing rod, said connector means including a clamp member disposed under the fishing rod, a pair of threaded connector members connected to said fishing reel and extending downwardly therefrom positioned alongside said fishing rod and disposed on opposed sides of the fishing rod and curved support, and nuts threaded on said threaded connector members;

a support harness; and an adaptor comprising a rigid, integral formed plate adapting said fishing rod and fishing reel for use with said support harness and connected to said support harness, said adaptor including a bifurcated, forwardly projecting first plate segment positioned between said fishing rod and said fishing reel, a second plate segment spaced from said first plate segment and projecting rearwardly of said first plate segment and a third plate segment disposed between and integral with said first plate segment and said second plate segment attaching said first plate segment and said second plate segment, said first plate segment located between said fishing reel and said clamp member and defining spaced openings on opposite sides thereof receiving said pair of threaded connector members to maintain said adaptor fixedly positioned relative to said fishing rod and said fishing reel with said first plate segment clamped between the fishing reel and the clamp member and said second plate segment positioned rearwardly of said reel and to provide releasable interconnection to said support harness, said second plate segment projecting away from said fishing reel and defining two spaced harness support clip receiving apertures located rearwardly of the fishing reel and spaced from the spaced openings defined by the first plate segment, said third plate segment curving rearwardly and upwardly from said first plate segment whereby said second plate segment is located above the level of said first plate segment and above the rod, said third plate segment engaging the fishing reel, and said bifurcated first plate segment and said third plate segment defining a void receiving said curved support.

\* \* \* \* \*